United States Patent
Park (10) Patent No.: US 7,589,519 B2
(45) Date of Patent: Sep. 15, 2009

(54) ELECTRONIC APPARATUS WITH DRIVING POWER HAVING DIFFERENT VOLTAGE LEVELS

(75) Inventor: Hee-Jun Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/210,907

(22) Filed: Aug. 25, 2005

(65) Prior Publication Data

US 2006/0091897 A1 May 4, 2006

(30) Foreign Application Priority Data

Aug. 25, 2004 (KR) .............. 10-2004-0067130

(51) Int. Cl.
*G01R 31/28* (2006.01)
(52) U.S. Cl. .................................... 324/158.1
(58) Field of Classification Search .............. None
See application file for complete search history.

(56) References Cited

U.S. PATENT DOCUMENTS

| | | | | |
|---|---|---|---|---|
| 3,894,284 | A * | 7/1975 | Morrison et al. | 324/418 |
| 5,912,514 | A * | 6/1999 | Stendardo et al. | 324/524 |
| 6,384,608 | B1 * | 5/2002 | Namaky | 324/430 |
| 6,404,145 | B1 * | 6/2002 | Saito | 315/307 |
| 6,700,361 | B2 | 3/2004 | Gregorius | |
| 6,943,683 | B2 * | 9/2005 | Perret | 340/538 |
| 7,058,484 | B1 * | 6/2006 | Potega | 324/426 |
| 2005/0007137 | A1 * | 1/2005 | Gunn et al. | 324/760 |

FOREIGN PATENT DOCUMENTS

| | | | |
|---|---|---|---|
| EP | 0 887 920 A2 | | 12/1998 |
| JP | 04174986 A | * | 6/1992 |
| JP | 11-203265 | | 7/1999 |
| JP | 2004072803 A | * | 3/2004 |
| JP | 2006023197 A | * | 1/2006 |
| KR | 1997-045555 | | 7/1997 |
| KR | 20-0237624 | | 6/2001 |
| KR | 20-0311039 | | 4/2003 |

OTHER PUBLICATIONS

Korean Patent Office Action dated Jan. 17, 2006.

* cited by examiner

*Primary Examiner*—Jermele M Hollington
(74) *Attorney, Agent, or Firm*—Staas & Halsey LLP (57) ABSTRACT

The present invention relates to an electronic apparatus comprising a plurality of electronic components, further comprising a connection detector to detect whether an external device is connected to a connector, and a regulator module to supply driving power having one of first and second voltage levels different from each other according to detection results of the connection detector to at least one of the electronic components and/or the external device. Thus, the present invention provides an electronic apparatus comprising a regulator module that outputs power having voltage levels different according to whether an external device is connected thereto.

1 Claim, 6 Drawing Sheets

ELECTRONIC APPARATUS WITH DRIVING POWER HAVING DIFFERENT VOLTAGE LEVELS

CROSS-REFERENCE TO RELATED APPLICATIONS

This application claims the benefit of Korean Patent Application No. 2004-67130, filed on Aug. 25, 2004, in the Korean Intellectual Property Office, the disclosure of which is incorporated herein by reference.

BACKGROUND OF THE INVENTION

1. Field of the Invention

The present invention relates to an electronic apparatus, and more particularly, to an electronic apparatus comprising a regulator module that outputs driving power having voltage levels different according to whether an external device is connected thereto.

2. Description of the Related Art

Generally, an electronic apparatus using a battery, for example, a portable computer such as a laptop computer, a notebook computer, a personal digital assistant (PDA), etc a mobile phone, a compact disk (CD) player, a video camcorder, and so on has been widely used because it has advantages of portability and availability while being carried. Further, such a portable electronic apparatus can be connected to an adapter to receive commercial alternating current (AC) power as well as power from the battery.

Together with the development of the portable electronic apparatus, the importance of battery technology used in the portable electronic apparatus is looming large. Since power supply is necessary to the portable electronic apparatus while the portable electronic apparatus is being carried, the battery supplying the power to the portable electronic apparatus has been developed in regard to its charging capacity and use time. Further, there has been developed, various methods for increasing the use time of the electronic apparatus with respect to the battery having the same charging capacity. That is, there are various methods for minimizing power consumption of the electronic apparatus.

Figure 1:
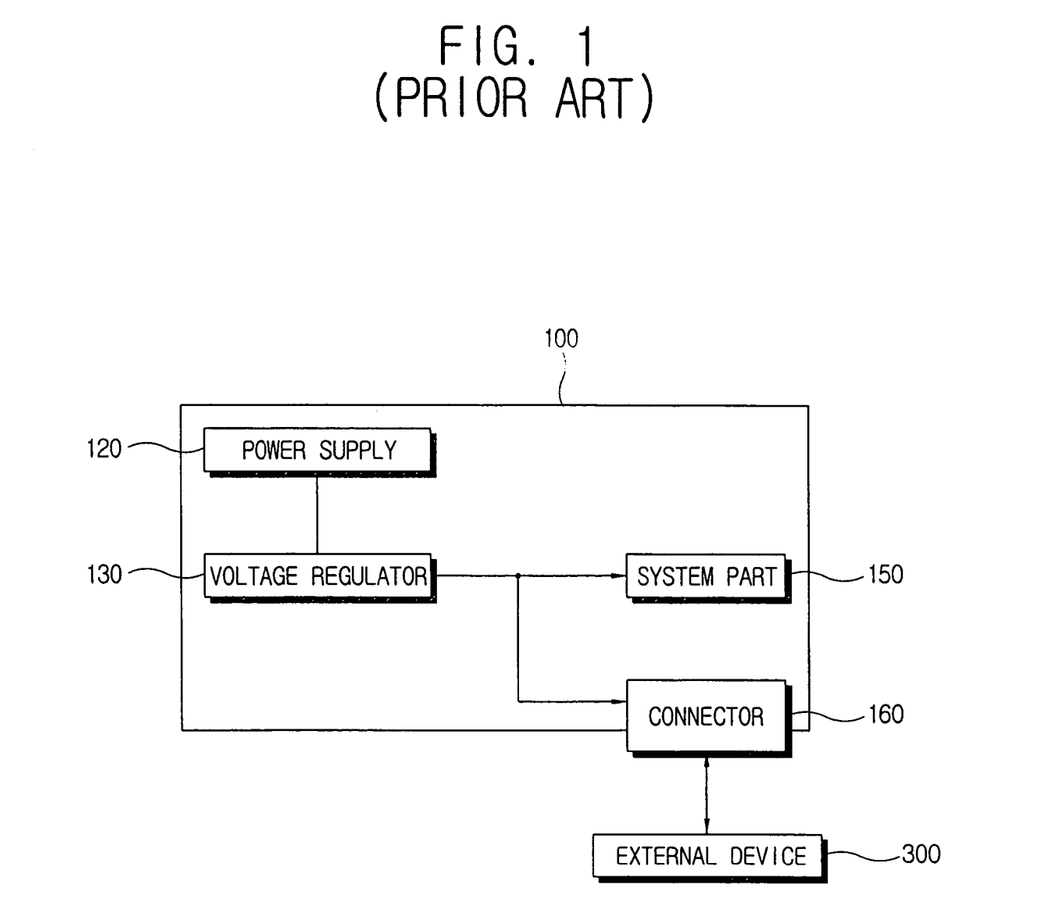
FIG. 1 is a control block diagram illustrating a conventional electronic apparatus.

FIG. 1 is a control block diagram for illustrating a power supplying system of a conventional electronic apparatus. As shown therein, a conventional electronic apparatus 100 includes a system part 150 including a plurality of electronic components performing inherent functions of the electronic apparatus 100, a power supply 120 such as an adapter and/or a battery to supply power to the electronic apparatus 100, and a voltage regulator 130 to change the power supplied from the power supply 120 into driving power suitable for each electronic components of the system part 150.

Further, the electronic apparatus such as a portable computer comprises various connectors 160 to which various external devices 300 are connected. For example, the connector 160 includes a universal serial bus (USB) port supporting an USB interface.

Generally, the connector 160 supporting the USB interface or the like is standardized to supply the driving power from the voltage regulator 130 of the electronic apparatus 100 to the external device 300. For example, in the case of the USB interface, the power supplied from the electronic apparatus 100 to the external device 300 is standardized to have a voltage level of 5V, and the external device 300 such as a memory stick supporting the USB interface is manufactured by an external device manufacturer to be driven with a driving power of 5V.

Further, the electronic apparatus is manufactured by an electronic apparatus manufacturer to have the voltage regulator 130 that outputs a voltage level of 5V among various voltage levels to the external device 300 through the USB port, thereby adhering with the standard for supplying the power through the USB interface.

Meanwhile, the electronic components of the system part 150 receiving the power from the voltage regulator 130 have specification about the voltage level required for its own driving. Generally, an electronic component manufacturer allows a reference voltage level for optimum driving of the electronic components to leave a voltage margin of a predetermined percentage. For example, in the case of electronic components requiring a driving power of 5V, a voltage margin of about ±5% is left, so that the electronic component can be driven within a voltage range from the minimum voltage of 4.75V to the maximum voltage of 5.25V. Therefore, even though the power supplied from the voltage regulator 130 has an unstable voltage level, the electronic apparatus 100 can be stably driven.

In the case where the power does not have the voltage level of 5V, but a voltage level of between 4.75V and 5V is supplied to the electronic component while the electronic component is being driven, it is expected that power consumption be reduced corresponding thereto. That is, when the electronic apparatus 100 is manufactured, the electronic apparatus manufacturer can lower the voltage level of the power outputted from the voltage regulator 130 in consideration of the foregoing voltage margin of the electronic component. However, as illustrated in FIG. 1, when the power outputted from the voltage regulator 130 is supplied to the external device 300, the electronic apparatus manufacturer cannot consider the voltage margin of the external device, so that the external device 300 may operate unstably.

Accordingly, if the voltage level of the power outputted from the voltage regulator varies according to whether the external device 300 is connected to the electronic apparatus 100, power consumption is decreased when the external device 300 is not connected to the electronic apparatus 100, and the external device 300 operates stably when the external device 300 is connected to the electronic apparatus 100.

SUMMARY OF THE INVENTION

Accordingly, it is an aspect of the present invention to provide an electronic apparatus including a regulator module that outputs power having different voltage levels depending on whether an external device is connected thereto.

The foregoing and/or other aspects of the present invention are also achieved by providing an electronic apparatus including a plurality of electronic components, further including a connection detector to detect whether an external device is connected to a connector, and a regulator module to supply driving power having one of first and second voltage levels different from each other according to the detection results of the connection detector that is connected to at least one of the electronic components and/or the external device.

According to an aspect of the present invention, the regulator module outputs the driving power having the first voltage level when the connection detector detects that the external device is connected to the connector, and outputs the driving power having the second voltage level when the connection detector detects that the external device is not connected to the connector, and the first voltage level is higher than the second voltage level.

According to an aspect of the present invention, the driving power having the second voltage level is lower than a reference voltage level needed for driving the electronic components.

According to an aspect of the present invention, the regulator module comprises a level selector to select one of the first and second voltage levels in correspondence with the detection results of the connection detector, and a driving power generator to generate the driving power having one of the first and second voltage levels in correspondence with the selection of the level selector.

According to an aspect of the present invention, the voltage level of the driving power outputted from the driving power generator is determined by a predetermined reference voltage and resistance of the voltage division resistors that divide the driving power to feed back, and the level selector selects one of the first and second voltage levels by varying the voltage level of the reference voltage in correspondence with the detection result of the connection detector.

According to an aspect of the present invention, the voltage level of the driving power outputted from the driving power generator is determined by a predetermined reference voltage and resistance of the voltage division resistors that divide the driving power to feed back, and the level selector selects one of the first and second voltage levels by varying the resistance of the voltage division resistors in correspondence with the detection result of the connection detector.

According to another aspect of the present invention, there is provided an electronic method including detecting whether an external device is connected to a connector, and supplying driving power having one of first and second voltage levels different from each other depending on the detected connection of the connector to at least one of electronic components and/or the external device.

According to an aspect of the present invention, the connector supports ones of a USB interface, a PCI interface, a card bus interface, and a secure digital (SD) card interface.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
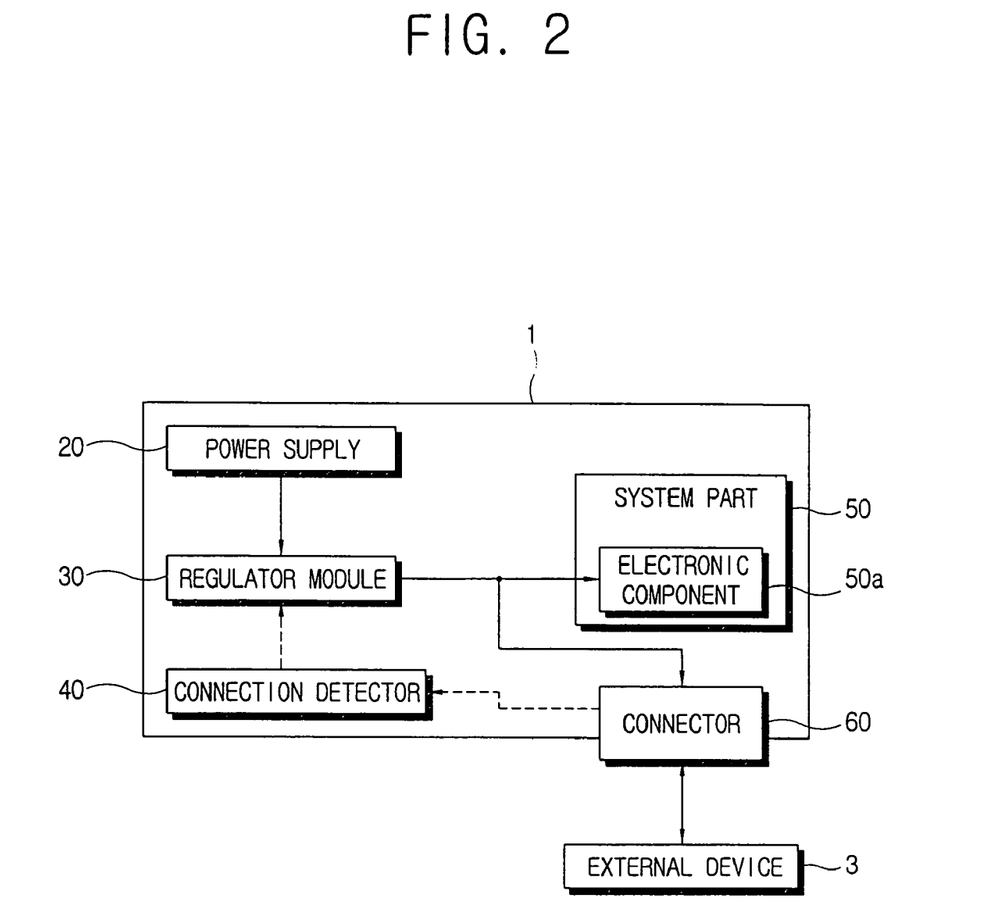
FIG. 2 is a control block diagram illustrating an electronic apparatus according to an embodiment of the present invention.

As illustrated in FIG. 2, an electronic apparatus 1 according to an embodiment of the present invention comprises a power supply 20, a system part 50, a connector 60, a connection detector 40, and a regulator module 30.

The power supply 20 supplies power for driving the system part 50 or the like of the electronic apparatus 1. The power outputted from the power supply 20 is used as input power $V_{in}$ of the regulator module 30, and the regulator module 30 changes a voltage level of the input power $V_{in}$ received from the power supply 20. According to an embodiment of the present invention, the power supply 20 includes an adapter that converts commercial AC power into direct current (DC) power, and/or a battery supplying the DC power. The battery is detachably provided in the electronic apparatus 1. Further, the battery can include a secondary battery that is rechargeable by a charging part (not shown).

Figure 3:
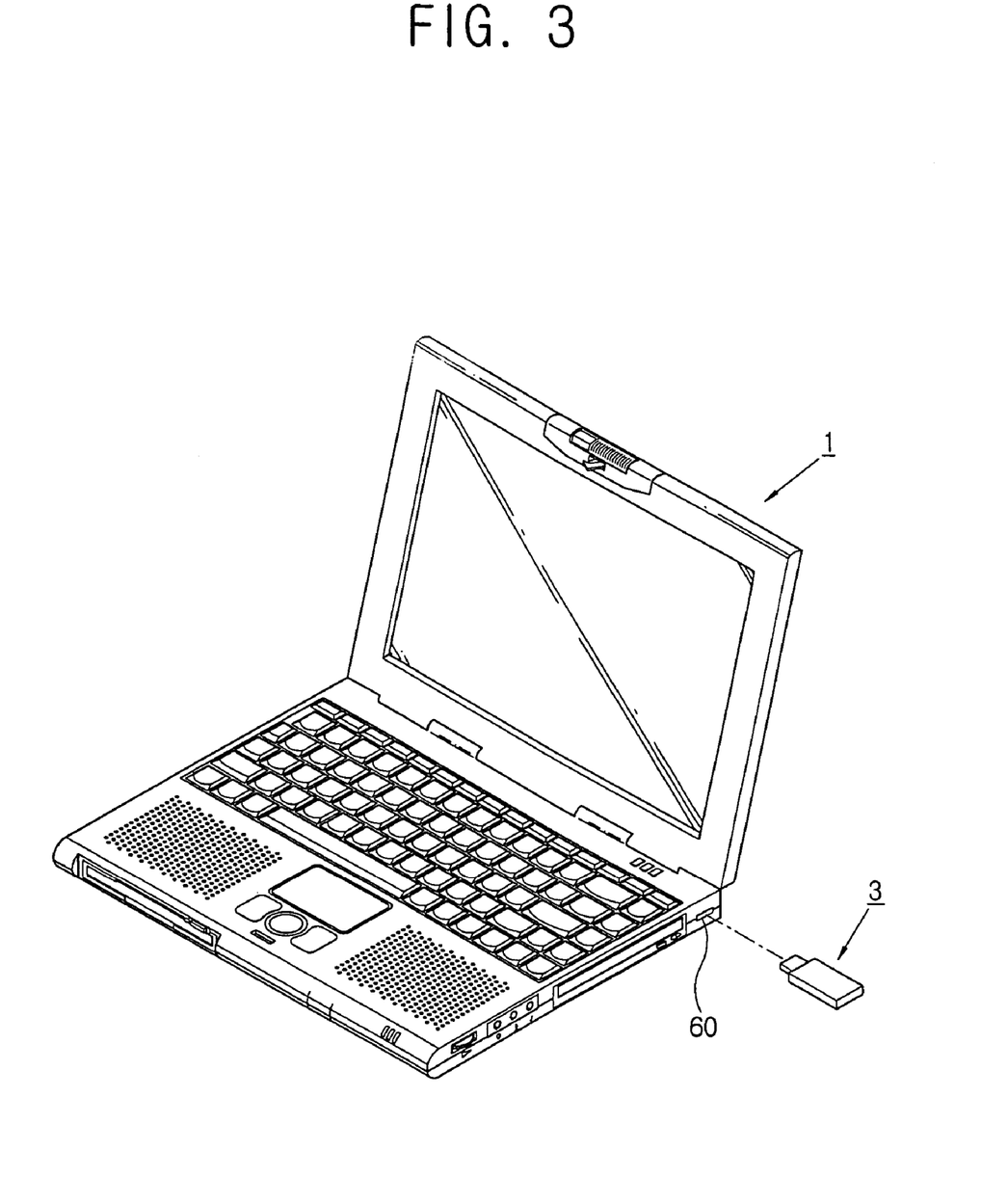
FIG. 3 is a perspective view illustrating a portable computer as an example of the electronic apparatus according to an embodiment of the present invention.

The system part 50 comprises a plurality of electric components 50a that performs inherent functions of the electronic apparatus 1. For example, in the case where the electronic apparatus 1 according to an embodiment of the present invention is a portable computer as shown in FIG. 3, the electronic components 50a of the system part 50 includes a central processing unit (CPU), a memory such as a random access memory (RAM), a chipset, a main board, a graphic card, etc. Here, each electronic components 50a of the system part 50 is driven by receiving the power having various voltage levels from the regulator module 30 and a plurality of voltage regulators (not shown).

An external device 3 is connected to the connector 60. According to an embodiment of the present invention, the external device 3 connected to the connector 60 can be driven by receiving power (hereinafter, referred to as "driving power") from the regulator module 30 through the connector 60.

The connector 60 can support various interfaces to receive the driving power $V_{out}$ from the regulator module 30 of the electronic apparatus 1. For example, the connector 60 according to an embodiment of the present invention supports one of a USB interface, a peripheral component interconnect (PCI) interface, a card bus interface, and a secure digital (SD) card interface. Thus, the external device 3 is connected to the electronic apparatus 1 through one of interfaces of the connector 60. FIG. 3 illustrates a USB port provided in a portable computer as an example of the connector 60, and a memory stick as an example of the external device 3 supporting the USB interface.

The connection detector 40 detects whether the external device 3 is connected to the connector 60. Further, the connection detector 40 outputs a detection signal ED_Detect to the regulator module 30 in correspondence with whether the external device 3 is connected to the connector 60 (refer to FIGS. 4 through 6).

The regulator module 30 outputs the driving power $V_{out}$ having voltage levels different according to detection results of the connection detector 40. That is, the regulator module 30 outputs the driving power $V_{out}$ having a first voltage level when the connection detector 40 detects that the external device 3 is connected to the connector 60 and outputs the detection signal ED_Detect corresponding thereto. Further, the regulator module 30 outputs the driving power $V_{out}$ having a second voltage level when the connection detector 40 detects that the external device 3 is not connected to the connector 60 and outputs the detection signal ED_Detect corresponding thereto. Here, the driving power $V_{out}$ having the first voltage level is supplied to both the external device 3 and the electronic components 50a receiving the driving power $V_{out}$ from the regulator module 30. Further, the driving power $V_{out}$ having the second voltage level is supplied to the electronic components 50a receiving the driving power $V_{out}$ from the regulator module 30.

Preferably, the first voltage level of the driving power $V_{out}$ outputted from the regulator module is used as a reference voltage level for optimum driving of the electronic components 50a. Therefore, when the external device 3 is connected, the power is stably supplied to the electronic components 50a regardless of a voltage margin of the external device 3.

Further, the second voltage level of the driving power $V_{out}$ outputted from the regulator module is lower than the reference voltage level needed for driving the electronic components 50a receiving the driving power $V_{out}$ from the regulator module 30. Further, when the reference voltage level needed for driving the electronic components 50a is of 5V, the second voltage level is lower than 5V.

Preferably, the second voltage level approximates to the minimum driving voltage level for driving the electronic components 50a but is higher than the minimum driving voltage level. Thus, even though the electronic components 50a receives the driving power $V_{out}$ having the second voltage level from the regulator module 30, the electronic components 50a can be operated stably.

Figure 4:
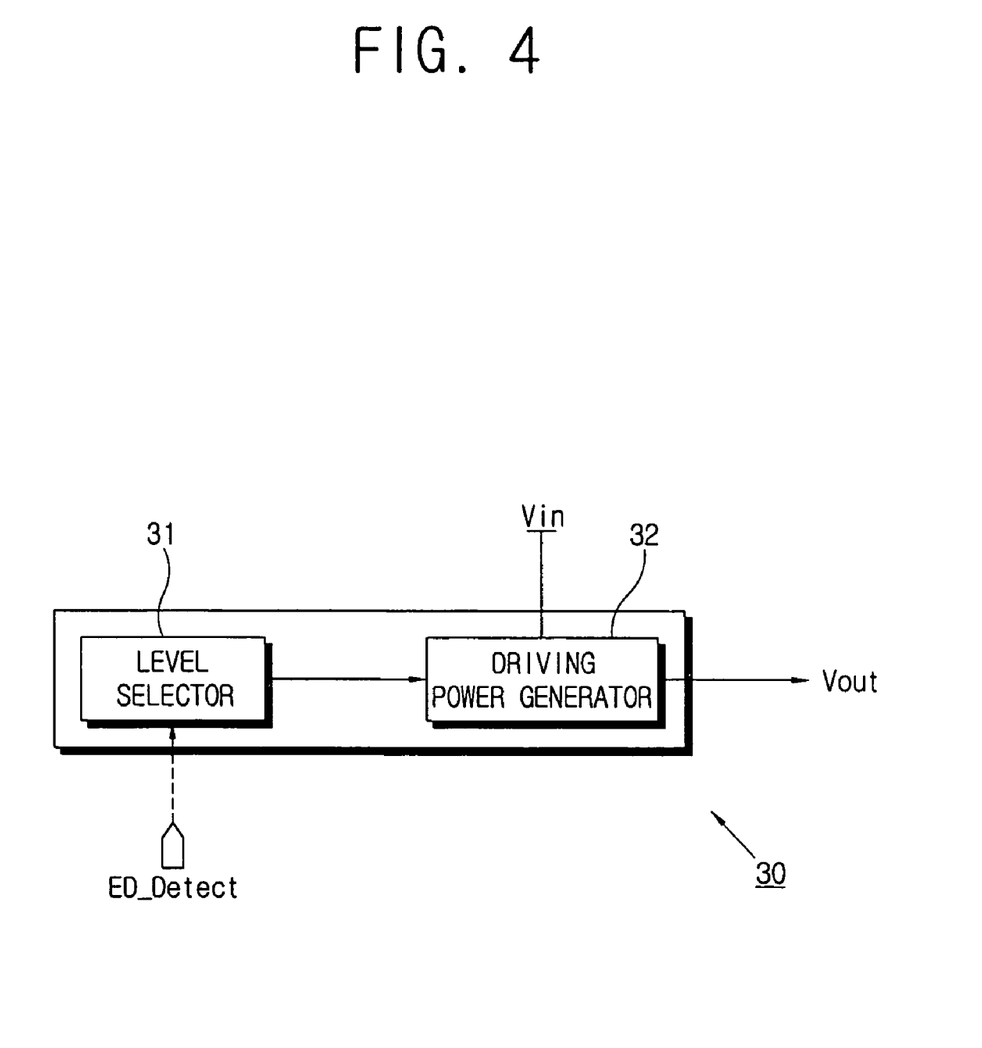
FIG. 4 is a control block diagram illustrating a regulator module according to an embodiment of the present invention.

Meanwhile, FIG. 4 is a control block diagram of the regulator module 30 according to an embodiment of the present invention. As shown therein, the regulator module 30 according to an embodiment of the present invention comprises a level selector 31 to select the voltage levels of the driving power $V_{out}$ outputted from the regulator module 30 in correspondence with the detection results of the connection detector 40, and a driving power generator 32 to generate the driving power $V_{out}$ having the voltage level corresponding to the selection of the level selector 31.

According to an embodiment of the present invention, the voltage level of the driving power $V_{out}$ outputted from the driving power generator 32 is determined by a predetermined reference voltage $V_{ref}$ and the resistance of the voltage division resistors that divide the driving power $V_{out}$ to feed it back.

Further, the level selector 31 varies one of the reference voltage $V_{ref}$ and the resistance of the voltage division resistors, thereby varying the voltage level of the driving power $V_{out}$ generated by the driving power generator 32. Here, the voltage level of the driving power $V_{out}$ is calculated by the following equation 1:

$$V_{out}=V_{ref}\times\{1+R_A/R_B\}$$ [equation 1]

where $V_{out}$ is the driving power generated by the driving power generator 32; $V_{ref}$ is the reference voltage; and $R_A$ and $R_B$ are voltage division resistors connected to each other in parallel.

Figure 5:
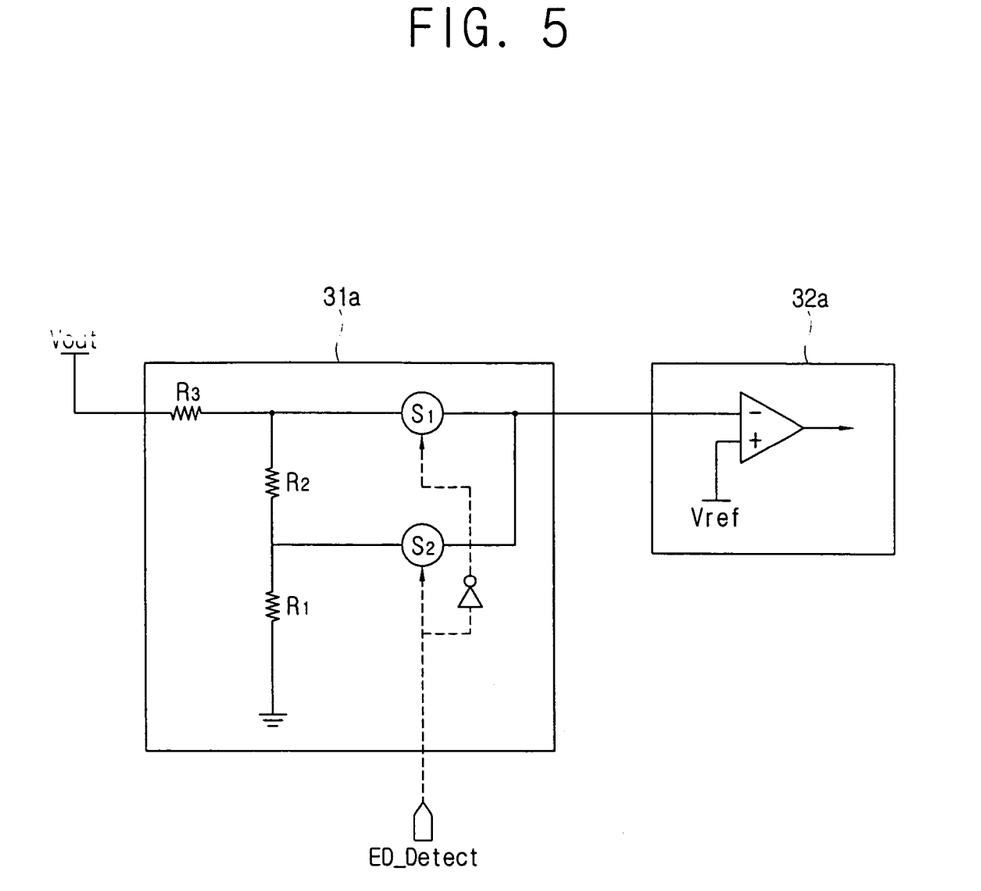
FIGS. 5 and 6 are circuit diagrams illustrating the regulator modules according to an embodiment of the present invention.

FIG. 5 is a circuit diagram of the regulator module 30 according to an embodiment of the present invention. Here, the level selector 31a comprises switching parts S1, S2 to be turned on/off in response to the detection signal ED_Detect from the connection detector 40 so as to vary the resistance of the voltage division resistors R1, R2, R3. The switching parts S1, S2 comprise switching devices that turn on/off alternately with each other in response to the detection signal ED_Detect from the connection detector 40. Further, the resistance of the three voltage division resistors R1, R2, R3 are varied accordingly as the two switching devices S1, S2 are turned on/off alternately with each other.

That is, when the switching device S1 is turned on and the switching device S2 is turned off, the voltage division resistor R2 is connected to the voltage division resistor R1 in series and connected to the voltage division resistor R3 in parallel. In this case, the voltage level of the driving power $V_{out}$ outputted from the driving power generator 32a is calculated as the following equation 2:

$$V_{out}=V_{ref}\times\{1+R_3/(R1+R2)\}$$ [equation 2]

Contrarily, when the switching device S2 is turned on and the switching device S1 is turned off, the voltage division resistor R2 is connected to the voltage division resistor R3 in series and connected to the voltage division resistor R1 in parallel. In this case, the voltage level of the driving power $V_{out}$ outputted from the driving power generator 32a is calculated as the following equation 3:

$$V_{out}=V_{ref}\times\{1+(R3+R2)/R1\}$$ [equation 3]

Thus, the voltage level of the driving power $V_{out}$ outputted from the driving power generator 32a can be varied by the level selector 31a comprising two switching devices S1, S2 to be turned on/off alternately with each other in response to the detection signal ED_Detect from the connection detector 40.

Figure 6:
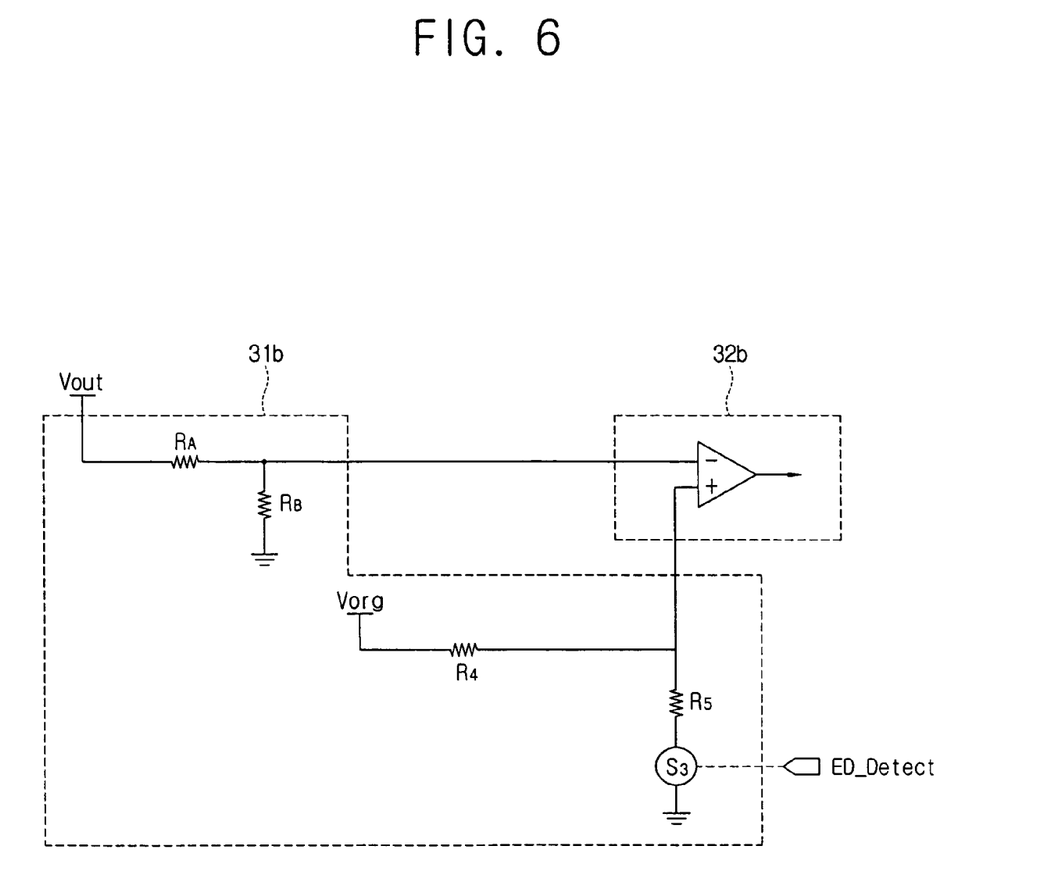

FIG. 6 is a circuit diagram of the regulator module 30 according to another embodiment of the present invention. Here, the level selector 31b comprises a switching device S3 to be turned on/off in response to the detection signal ED_Detect from the connection detector 40, and voltage division resistors R4, R5, thereby varying the reference voltage $V_{ref}$. That is, the voltage level of the reference voltage $V_{ref}$ is varied into $V_{org}$ or $V_{org}\times R5/(R4+R5)$ depending on whether the switching device S3 of FIG. 6 is turned on/off, thereby varying the voltage level of the driving power $V_{out}$ outputted from the driving power generator 32b.

FIGS. 5 and 6 illustrate configurations for varying the resistance of the voltage division resistors R1, R2, R3 and the reference voltage $V_{ref}$ with respect to the feedback voltage in order to vary the voltage level of the driving power $V_{out}$ outputted from the regulator module 30. Besides, it should be appreciated by those skilled in the art that various configurations for varying the resistance of the voltage division resistors and the reference voltage are possible without departing from the principles and spirit of the invention.

For example, FIG. 6 illustrates that Vorg for the reference voltage $V_{ref}$ is generated in the level selector 31b. Alternatively, Vorg may be generated in the driving power generator 32b or in an external part.

Further, FIG. 6 illustrates that the voltage division resistors R4, R5 are provided in the level selector 31b. Alternatively, at least one of the voltage division resistors R4, R5 may be provided in the driving power generator 32b.

Thus, the electronic apparatus 1 according to an embodiment of the present invention comprises the connector 60 to which an external device 3 is connected, the connection detector 40 detecting whether the external device 3 is connected to the connector 60, and the regulator module 30 outputting the driving power $V_{out}$ having voltage levels different according to the detection results of the connection detector 40, and outputting it to at least one of the electronic components 50a and/or the external device 3, so that the driving power outputted from the voltage regulator module 30 is lowered when the external device 3 is not connected to the electronic apparatus 1, thereby reducing power consumption.

Particularly, in a portable electronic apparatus 1 such as a portable computer using a battery, use time of the battery is increased.

As described above, the present invention provides an electronic apparatus comprising a regulator module that outputs power having voltage levels different according to whether an external device is connected thereto.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An electronic method comprising:
   detecting whether an external device is connected to a connector of an electronic apparatus;
   supplying driving power from a power supply unit of the electronic apparatus, the driving power having one of first and second voltage levels different from each other depending on the detected connection of the connector to at least one of electronic components and/or the external device;
   selecting one of the first and second voltage levels in correspondence with the detected connection; and
   generating the driving power having one of the first and second voltage levels.

* * * * *